MAGNETIC MEMORY CIRCUITS

Filed Oct. 14, 1959

INVENTOR
J. L. SMITH
BY
William H. Kamstra
ATTORNEY 3,060,411
Patented Oct. 23, 1962

3,060,411

MAGNETIC MEMORY CIRCUITS

James L. Smith, Basking Ridge, N.J., assignor to Bell Telephone Laboratories, Incorporated, New York, N.Y., a corporation of New York Filed Oct. 14, 1959, Ser. No. 846,507
2 Claims. (Cl. 340—174)

Figure 1:
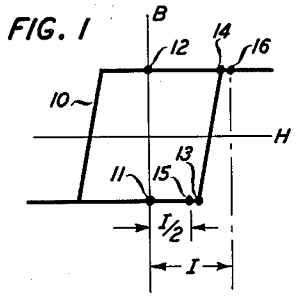

This invention relates to information storage arrangements and more particularly to magnetic memory matrices adaptable for use in such arrangements.

Memory matrices utilizing magnetic cores having substantially rectangular hysteresis characteristics are well known and have advantageously found wide application wherever information in a binary form must be temporarily or permanently stored and must also be readily accessible. Toroidal cores, and those which represent specific variations of the closed toroidal core structure, normally have inductively coupled thereto two or more coils which may be used to "set" the core to a particular magnetic condition representative of an information bit to be stored. Readout is normally accomplished by switching the magnetic condition of the core by applying current to a readout coil inductively coupled thereto and observing the signal, if any, produced on a sensing coil also inductively coupled to the core being read.

The cores are normally arranged in columns and rows to form a memory matrix. Each core of a column is then inductively coupled to one of a plurality of serially connected column coils, while each core of a row is inductively coupled to one of a plurality of serially connected row coils. A readout coil is inductively coupled to all the cores of the matrix. A particular core is chosen for the storage of binary information by applying sufficient coincident current to the row coil and column coil coupled to that core to switch the magnetic condition of the core. The currents applied to the row coils and column coils separately are each less than the critical value necessary to switch the cores thereby preventing the switching of any cores other than the particular chosen core receiving coincident current on both its column coil and its row coil. Readout is normally accomplished by driving the core toward a particular polarity. If the core is already at this polarity, no voltage is induced in the readout coil; but if it is not at this polarity, then a voltage is induced in the readout coil. In addition to two-dimensional arrays the cores may also be utilized in a three-dimensional array comprising a plurality of two-dimensional storage planes. The three-dimensional array permits the storage of a word consisting of a plurality of binary digits with the digits being stored in corresponding positions in the plurality of storage planes.

The inductive coupling of a coil to a core may be accomplished by actually winding a conductor about the core a number of times in the conventional manner or by merely threading the core to achieve the necessary inductive coupling. The necessary conductors controlling and sensing the magnetic states of the cores must be operatively associated with the cores and the cores themselves must either be mounted or maintained in a manner so as to prevent interaction or interference. Problems of fabricating the matrix and of wiring the individual cores thus arise in the conventional magnetic core memory matrix. Additionally, it is frequently necessary to reduce the circuit components including the magnetic memory elements to minimal dimensions; but the requirement of winding and threading the cores by a number of, and frequently many, conductors results in a limiting dimension below which a toroidal core is not conveniently reducible. The above problems can advantageously be greatly diminished by utilizing magnetic wire elements such as those described in the copending application of A. H. Bobeck, Serial No. 675,522, filed August 1, 1957, rather than the conventional toroidal magnetic cores. These magnetic wire elements have become known in the art as twistor wire elements.

Difficulties arise, however, when coincident current techniques are desired to be utilized in connection with a memory matrix comprised of the aforesaid magnetic wire elements. For coincident current switching, each of the two currents applied must be of a magnitude such that the presence of one current will not switch the magnetic element while the simultaneous application of both currents will switch the magnetic element. Thus it is apparent that for optimum operation the bit addresses must have substantially rectangular hysteresis loops and that the hysteresis loops of all the addresses must be substantially identical. Unfortunately the hysteresis loops of the addresses of the magnetic wire elements, although substantially rectangular, have been found to be of nonuniform sizes. This lack of substantial uniformity produces difficulties both in preventing some of the bit addresses from switching in response to just one applied current and in insuring that each address will switch in response to the two coincident currents.

Coincident current operation could be obtained by utilizing toroidal cores as access means for the storage of information in the memory matrix. Thus the coincident currents are applied to the cores in the conventional manner, but output coils inductively coupled to the access cores are also connected to the magnetic wire elements for the purpose of storing information in the matrix. The difficulties resulting from the nonuniformity of the hysteresis characteristics of the magnetic wire elements are eliminated since the access cores rather than the elements differentiate between the application of single and coincident currents. However, achieving coincident current operation in this manner requires the use of a substantial number of cores with the attendant extra cost, also introduces problems in regard to the mounting and wiring of the cores and also necessarily increases the size of the matrix.

Accordingly, it is an object of this invention to provide a memory matrix using magnetic wire elements wherein coincident current techniques can be applied directly to the magnetic wire elements.

It is another object of this invention to store information in a magnetic core matrix such that the information so stored is not destroyed by the readout operation.

A further object of this invention is the realization of a new and improved memory matrix.

A still further object of this invention is the storage of binary information in a magnetic memory matrix in a new and novel manner.

Yet another object of this invention is the storage of information in a magnetic memory matrix such that the information so stored is not destroyed by the inadvertent switching of the magnetic state of a bit.

The above and other objects are realized in one embodiment according to the principles of this invention comprising an arrangement of magnetic wire elements in an array wherein the information stored in the array is determined by the distribution of permanent magnets on a magnet card associated with the array. The magnets determining the information stored are associated with particular bit addresses of the magnetic elements and hold the associated addresses in a particular magnetic state. These addresses are thereby prevented from switching responsive to the application of coincident current. Accordingly, information may be stored in a matrix according to the present invention by the presence or absence of these magnets in the proximity of the addresses in which the information is to be stored. This method of storage is similar to that described in connection with magnetic core arrays, in the copending application of S. M. Shackell, Serial No. 708,127, filed January 10, 1958. In addition to the aforementioned magnets, other magnets are distributed on the magnet card and associated with the other addresses for the purpose of biasing these bits and thereby enabling coincident current techniques to be used for the switching of these bits. The biasing permtis the use of coincident currents of greater magnitude and greatly reduces the deleterious effects caused by the nonuniformity of the hysteresis characteristics of the bit addresses.

The biasing could also be accomplished by the application of direct current directly to the magnetic wire element, however, this wastes power, heats the circuit thereby causing changes in the properties of the magnetic circuit, and presents other difficulties. Biasing could also be accomplished by the application of direct current to separate biasing conductors, but this is a comparatively clumsy method. Biasing by means of permanent magnets distributed on a magnet card appears to be the most advantageous means of biasing and this is especially true when the same magnet card is also used to determine the informaiton stored in the matrix.

Thus according to one feature of this invention, binary information values are stored in particular bit addresses of an array comprising magnetic wire elements by representative operative conditions of the bit addresses. That is, one binary value may be determined by the condition of normal response to an applied switching current and the other binary value may be determined by the inability of the address to respond to an applied switching current. According to this feature particular addresses are disabled in accordance with the information which is to be stored, by placing, in one embodiment of the invention, permanent magnets in proximity to the addresses to be disabled such that the fields of the permanent magnets prevent the normal switching behavior of these addresses upon the application of a switching current. Thus, according to this feature of the present invention, information may be stored in a matrix comprising magnetic wire elements by the presence or absence of a magnet or its disabling field in the proximity of the addresses to which the information is to be stored.

According to another feature of this invention those addresses of the magnetic wire elements not disabled from switching by the aforesaid disabling magnets are biased by placing other permanent magnets in the proximity of the addresses to be biased. The fields of the biasing magnets will consequently require that a larger than normal switching current be necessary for the switching of these addresses. This biasing permits the use of coincident current methods of reading out the information stored in the array which would not otherwise be practicable because of the lack of uniformity of the square loop hysteresis characteristics of the bit addresses.

In accordance wtih still another feature of this invention both the disabling magnets and biasing magnets are distributed on the same magnetic card. The disabling and biasing magnets can be of the same or different materials and of the same or different size, the only requirement being that each magnet have the proper field intensity.

According to still another feature of this invention coincident current readout techniques are used to determine the particular information stored in the array. The biasing of the particular ones of the bit addresses makes this possible without the additional requirement of magnetic access cores.

According to yet another feature of this invention nondestructive interrogation of the information stored in the array is achieved by the utilization of the disabling magnets. Since the particular information stored is determined by the particular distribution of the disabling magnets, and since the bit addresses associated with these disabling magnets cannot be switched, readout can be accomplished by the switching of the other cores without destroying the stored information during the readout process. Additionally, an accidental applied swtiching current is nondestructive of stored information since in the case of a disabled address no such switching can occur and in the case of the other addresses the biasing magnets immediately restore the addresses to the proper state.

Figure 2:
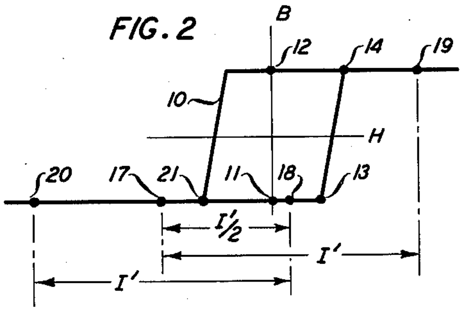
Figure 3:
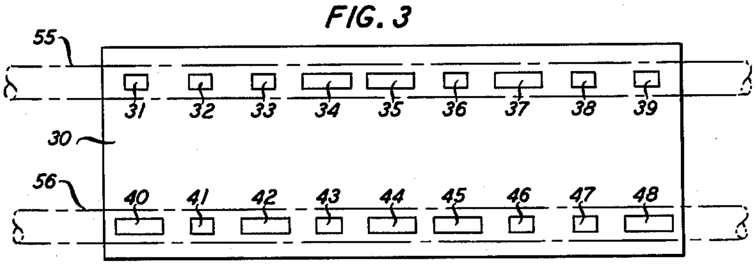
Figure 4:
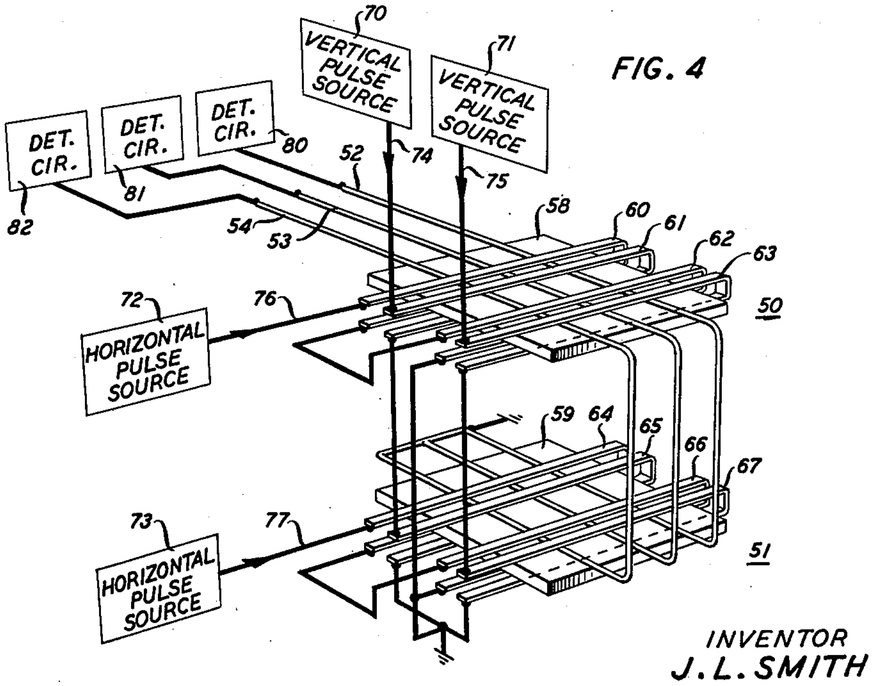

The foregoing and other objects and features of this invention will be clearly understood from a consideration of the detailed description thereof which follows when taken in conjunction with the following drawing in which:

FIG. 1 depicts an illustrative hysteresis characteristic of the magnetic wire element used in the memory matrix according to the principles of this invention and further depicts the magnitude of the currents normally required for coincident current operation of the matrix;

FIG. 2 depicts an illustrative hysteresis characteristic of the magnetic wire element used in the memory matrix according to the principles of this invention, further depicts the magnitude of the currents required for coincident current operation of the matrix when the element is biased by a magnetic field, and further shows that the coincidence of said currents will not switch the element when it is disabled by a stronger magnetic field;

FIG. 3 depicts a single magnet card having both disabling and biasing permanent magnets distributed thereon; and FIG. 4 depicts two planes of a three-dimensional magnetic wire element matrix showing one arrangement for reading out the information stored therein by coincident current means.

The hysteresis loop 10 shown in FIG. 1 is an illustrative loop of the rectangular type representative of the hysteresis characteristic of the magnetic wire element used in the present invention. The point 11 represents the remanent magnetic condition of the element following saturation in one direction and the point 12 represents the remanent magnetic condition of the element following saturation in the other direction. If the element is initially at the one point of remanent magnetization 11 then for proper coincident current operation the application of one of the currents to the element should be insufficient to drive the element past the knee 13 of the hysteresis loop while the application of both currents to the element should be sufficient to drive the element past the point 13 and to or past the point of opposite saturation 14. For illustrative purposes I/2 and I are shown in FIG. 1 as currents which would be satisfactory for coincident current operation of an element having the hysteresis loop 10. The current I/2 thus drives the element to the point 15 short of the knee 13 while the current I, representing the coincident application of two currents each of magnitude I/2, drives the element to the point 16 beyond the saturation point 14. Thus the current I will switch the magnetic state of the element and produce a change in the potential between the ends of the element, as described in the copending application of A. H. Bobeck referred to previously, while the current I/2 will produce little or no change of potential. It is obvious that for satisfactory coincident current operation the application of current I must produce a significant output signal while the application of current I/2 must produce little or no output. This is the case with the currents and hysteresis loop shown in FIG. 1, however it has been found that the hysteresis characteristics of the bit addresses of the magnetic wire elements are of non-uniform sizes. Thus the currents I/2 and I, while satisfactory for the hysteresis loop shown in FIG. 1, will often not be satisfactory for the hysteresis loops of all of the bit addresses in a magnetic wire element array. If the hysteresis loop shown in FIG. 1 is of an average size, then the current I/2 may drive some of the bit addresses past the knee point 13 on their respective loops while the current I may not drive others of the bit address past the knee 13 or to the saturation point 14 on their respective loops. Thus it can be seen that ordinary methods of coincident current readout are impracticable in a magnetic memory array comprising magnetic wire elements.

The hysteresis loop shown in FIG. 2 is again labeled 10 and the points 11, 12, 13, and 14 are also the same as the corresponding points on the loop of FIG. 1. If the element were again initially at the point of remanent magnetization 11 when there is no additional magnetic field present, then the presence of a permanent magnetic field of the proper polarity will cause the element to initially assume a position on the hysteresis loop 10 such as the point 17. For the coincident current operation described above, it can be seen that it would be advantageous if the application of a single current did not drive the element so far as to the point 15 of FIG. 1 but rather drove it to a point such as point 18 of the hysteresis loop 10 of FIG. 2. This would insure that none of the bit addresses switched during the application of the single current but in the operation described above would increase tremendously the problems of addresses not switching in response to the application of the coincident currents. It can be seen that even the addresses having the average hysteresis loop 10 of FIG. 2 would not switch responsive to a current of twice the magnitude of the current which would drive these addresses from point 11 to point 18. Likewise it would be advantageous if the application of coincident currents drove the address to a point on the hysteresis loop such as point 19 of FIG. 2 rather than to point 16 of FIG. 1 to thereby insure that all of the addresses of the array will be completely switched by the application of coincident currents. This would correspondingly increase the problem of some addresses switching responsive to the application of a single current. However, the application of a biasing magnetic field can enable coincident current readout methods to be used which drive the address represented by the loop 10 to the desired points 18 and 19. This is accomplished by applying a permanent magnetic field which causes the address to initially assume the magnetic condition represented by point 17 on the loop 10 of FIG. 2. The currents I′/2 and I′ shown in FIG. 2 will then drive the address to the points 18 and 19 respectively thereby insuring that all addresses of the array will switch properly responsive to the applied currents I′/2 and I′. The amount of biasing required to insure proper switching responsive to the application of the coincident currents will depend upon the relative uniformity of the hysteresis characteristics of the addresses utilized in a particular array.

The point 17 is shown in FIG. 2 as being beyond the knee point 21 of the loop 10. Thus, upon the termination of the current I′, the biasing magnetic field will cause the address to automatically switch from the point 19 back to the point 17. Even when the hysteresis characteristics of the addresses being employed do not require biasing beyond the knee point 21 for proper coincident current operation, such biasing may still be advantageously employed to effect the automatic return described above. Alternatively, reset pulses following the interrogation pulses can be used to return the addresses to the point 17 when that point is not beyond the knee point 21. Biasing beyond the knee point 21 has the additional advantage, however, of preventing an erroneous readout due to an inadvertent switching of the magnetic state of an address since any such inadvertent switching will immediately be neutralized by the automatic return to point 17.

Besides being biased by permanent magnetic fields, certain of the addresses can be disabled from switching by other and stronger magnetic fields for the purpose of storing binary information in the array. Thus those addresses disabled from switching can represent binary "zeros" while those addresses switching in response to coincident currents can represent binary "ones." Thus, if the address represented by the loop 10 of FIG. 2 were biased to the point 20, then the address would not be switched by the application of the coincident currents but would be driven only to the point 18. Storing information by the disabling of certain addresses also renders the readout nondestructive since the disabled addresses are not affected by the readout step and the switching of those addresses not disabled can be accomplished repeatedly.

The biasing and disabling of the selected addresses can be advantageously accomplished by the distribution of permanent biasing magnets and permanent disabling magnets 31 through 48 on a magnet card, constructed of non-magnetic material, such as the card 30 shown in FIG. 3. The biasing magnets 31, 32, 33, 36, 38, 39, 41, 43, 46, and 47 are here shown as being of a smaller size than the disabling magnets 34, 35, 37, 40, 42, 44, 45, and 48. Each magnet card is associated with a particular plane of the memory matrix and each magnet is associated with a particular bit address. The magnets 31 through 39 would be associated with one magnetic wire element and the magnets 40 through 48 would be associated with another magnetic wire element. The association between the magnets and the magnetic wire elements is shown in FIG. 3 by the dotted lines representative of magnetic wire elements 55 and 56. The plane of the memory matrix associated with the magnet card 30 could thus store nine words with each word containing two information bits. The magnets shown in FIG. 3 are shown as being of two different sizes representative of the biasing and disabling magnets. However, it is to be understood that the showing of two sizes is merely for the purpose of illustrating one means for obtaining biasing and disabling magnets having the proper magnetic fields. In addition to using magnets of the same material but of different sizes, magnets of the same size but of different materials or magnets of the same size and same material but magnetized to different intensities could be used, for example. One advantageous method for placing the magnets on the card is by the well known etching method. The magnets have been shown in FIG. 3 as being of a rectangular shape for illustrative purposes but can of course be easily etched in other shapes such as, for example, elliptical shapes.

Biasing of the desired bit addresses could also be accomplished by the application of direct current directly to the magnetic wire element, however this has the disadvantages of consuming power, heating the memory matrix unnecessarily, and rendering the design of the entire memory unit less flexible. Since the permanent magnets used for biasing can advantageously be added to the magnet cards containing the disabling magnets, it is apparent that this method of biasing is extremely advantageous and economical.

The coincident current operation of two memory planes 50 and 51 is depicted in FIG. 4. Magnetic wire elements 52, 53, and 54 are affixed to the non-conducting and non-magnetic support member 58, then extend downward to the lower memory plane and are there affixed to the non-conducting and non-magnetic support member 59. Also affixed to member 58 and inductively coupled to the elements 52, 53 and 54 are the horizontal strip solenoids 60 and 62 and the vertical strip solenoids 61 and 63. Similarly the horizontal strip solenoids 64 and 66 and the vertical strip solenoids 65 and 67 are affixed to member 59 and inductively coupled to the elements 52, 53, and 54. The bit addresses of the magnetic wire elements are located at the portions of the elements which are intersected by both the horizontal and vertical strip solenoids. The associated horizontal and vertical solenoids are shown as being adjacent each other in FIG. 4 for illustrative purposes but in actual operation one would preferably be outside the other to insure that both solenoids are coupled to the same portions of the magnetic wire elements. The memory planes shown in FIG. 4 can be seen to be capable of each storing two words with each word containing three information bits. The magnet cards associated with these planes would therefore each contain six magnets. For the purpose of more clearly describing an illustrative coincident current method of reading out the information stored in the memory planes of FIG. 4, the magnet cards associated with these memory planes have not been shown. However, it should be borne in mind that each memory plane will have a magnet card in proximity to it and that the information stored in the plane is determined by the relative distribution of biasing and disabling magnets on the card. Furthermore, every bit address of the memory plane is either disabled or biased by the magnets since each bit address of the plane has a particular magnet associated with it. Vertical readout current sources 70 and 71 and horizontal readout current sources 72 and 73 are used to supply the coincident currents used for interrogating the matrix. Vertical solenoids 61 and 65 are serially connected between source 70 and ground by conductor 74. Vertical solenoids 63 and 67 are serially connected between source 71 and ground by conductor 75. Horizontal solenoids 60 and 62 are serially connected between source 72 and ground by conductor 76. Horizontal solenoids 64 and 66 are serially connected between source 73 and ground by conductor 77. The magnetic wire elements 52, 53, and 54 are connected to ground at one end and to detection circuits 80, 81, and 82 respectively at their other ends. The current sources 70, 71, 72, and 73 and the detection circuits 80, 81, and 82 are shown in block diagram form only since they are well known in the art. The current sources need only supply current pulses of the proper magnitude while the detection circuits need only detect voltage changes in the ends of the respective magnetic wire elements.

The simultaneous application of currents to a horizontal strip solenoid and to its associated vertical strip solenoid will cause the switching of the biased bit address inductively coupled to said solenoids and output signals will be detected by the detection circuits associated with the magnetic wire elements containing said biased addresses. Any disabled bit addresses inductively coupled by the particular horizontal and vertical strip solenoids will, of course, not switch and will produce no output signal. The application of current to only one of a pair of associated strip solenoids will not be sufficient to switch any of the addresses coupled to that solenoid. Thus the coincident application of currents from one vertical current source and from one horizontal current source will interrogate that word stored in the bit addresses whose associated solenoids are both receiving current. Coincident current from sources 70 and 72 will therefore interrogate the word stored in the addresses coupled by solenoids 60 and 61 and each of the other combinations of coincident current from the sources shown in FIG. 4 will similarly interrogate a different one of the words stored in the memory planes of FIG. 4.

The method of coincident current readout shown in FIG. 4 and described herein is merely illustrative of one method of obtaining coincident current operation.

Although the present invention has been described with reference to a magnetic memory matrix employing magnetic wire elements, it obviously can also be used in conjunction with a matrix employing other magnetic elements such as conventional cores. In obtaining cores satisfactory for use in the conventional magnetic core memory matrices, individual cores are first tested and then sorted according to their hysteresis characteristics. Thus cores of sufficiently uniform hysteresis characteristics can be segregated and thereafter utilized in memory matrices employing coincident current techniques. However, by using this invention, the preliminary testing and sorting may advantageously be eliminated and a more random selection of cores utilized. Furthermore cores which otherwise might be discarded because of nonuniform hysteresis characteristics can be employed in memory matrices utilizing the invention disclosed herein.

Similarly the arrangements for biasing selected bit addresses of the magnetic wire elements described herein, which may advantageously be employed to carry out the principles of this invention, are to be understood as merely illustrative. Thus other means and methods will readily present themselves to one skilled in the art to effect selective biasing thereby enabling the coincident current operation of memory matrices utilizing magnetic wire elements. The other aspects of this invention described herein are also to be considered as illustrative and numerous other arrangements according to the principles of this invention may be devised with respect to these aspects also by one skilled in the art without departing from the spirit and scope of this invention.

What is claimed is:

1. In an $xy$ coordinate magnetic memory array for storing a plurality of binary information bits in a pattern of first permanent magnets arranged at particular crosspoints of said array, means for interrogating binary information words of said array comprising a pair of word drive conductors arranged along each of the $x$ coordinates of said array, a bit sensing conductor arranged along each of the $y$ coordinates of said array, a magnetic tape helically wrapped about each of said sensing conductors, said pairs of word drive conductors being inductively coupled to switching segments of said tapes at the crosspoints of said array, said switching segments having hysteresis characteristics including coercivities within a predetermined range represented by substantially rectangular loops having well-defined knees therein, means for coincidentally applying half-select current pulses to the drive conductors of each of said pairs of drive conductors in particular combinations such that both conductors of a pair of drive conductors along a selected $x$ coordinate have a half-select current pulse applied thereto and such that only one of said drive conductors alone of each of the remaining pairs of drive conductors along the remaining $x$ coordinates has a half-select current pulse applied thereto, said first permanent magnets along said selected $x$ coordinate having fields of a magnitude sufficient to prevent flux switching in switching segments of said tapes at the corresponding crosspoints responsive to said coincident half-select pulses, means for preventing flux switching beyond the knee of the hysteresis loops of the switching segments of said tapes defined on said remaining $x$ coordinates at other than said particular crosspoints of said array responsive to half-select current pulses applied to only one of said drive conductors arranged along each of said remaining $x$ coordinates comprising a plurality of second permanent magnets arranged at each of the crosspoints of said array other than said particular crosspoints, said second permanent magnets applying magnetic fields to the corresponding switching segments of said tapes to bias said segments in a direction opposite to that of the magnetomotive forces applied to said segments by said half-select pulses; and means for detecting readout signals in said sensing conductors.

2. In an $xy$ coordinate magnetic memory array for storing a plurality of binary information words arranged along the $x$ coordinates of said array having the information bits thereof represented by a pattern of first permanent magnets arranged at particular crosspoints of said array, means for interrogating a selected information word comprising a pair of word drive conductors arranged along the $x$ coordinate of said array containing said selected information word, a bit sensing conductor arranged along each of the $y$ coordinates of said array, a magnetic tape helically wrapped about each of said sensing conductors, said pair of drive conductors being inductively coupled to switching segments of said tapes at crosspoints of said array, said switching segments having hysteresis characteristics including coercivities within a predetermined range represented by substantially rectangular loops having well-defined knees therein, means for applying half-select current pulses to one of the drive conductors alone and for applying coincident half-select current pulses to both of said drive conductors, said first permanent magnets along the $x$ coordinate containing said selected information word having fields of a magnitude sufficient to prevent flux switching in switching segments of said tapes at corresponding crosspoints when half-select current pulses are coincidentally applied to both of said drive conductors, means for preventing flux switching beyond the knee of the hysteresis loops of the remaining switching segments on said $x$ coordinate containing said selected information word responsive to half-select current pulses applied to only one of said drive conductors comprising a plurality of second permanent magnets arranged at each of the crosspoints of said array other than said particular crosspoints, said second permanent magnets applying magnetic fields to the corresponding switching segments of said tapes in a direction opposite that of the magnetomotive force applied to said segments by a half-select current pulse alone and less than the field applied to said segments by the combined effect of two half-select current pulses; and means for detecting read-out signals in said sensing conductors.

References Cited in the file of this patent

UNITED STATES PATENTS

| | | |
|---|---|---|
| 2,734,184 | Rajchman | Feb. 7, 1956 |
| 2,740,110 | Trimble | Mar. 27, 1956 |
| 2,769,873 | Noregaard | Nov. 6, 1956 |
| 2,781,503 | Saunders | Feb. 12, 1957 |